No. 803,493. PATENTED OCT. 31, 1905.
M. S. LEWIS.
LONG DISTANCE ELECTRIC CIRCUIT.
APPLICATION FILED MAY 4, 1905.
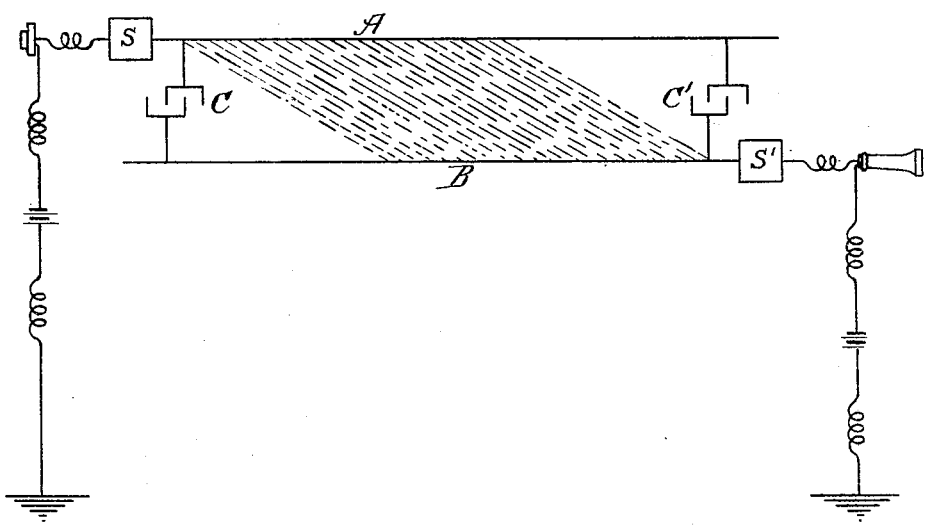
WITNESSES
INVENTOR
Mark S. Lewis

UNITED STATES PATENT OFFICE.

MARK S. LEWIS, OF MEDFORD, MASSACHUSETTS, ASSIGNOR OF ONE-THIRD TO GEORGE F. WOODLEY, OF PROVIDENCE, RHODE ISLAND.

LONG-DISTANCE ELECTRIC CIRCUIT.

No. 803,493.      Specification of Letters Patent.      Patented Oct. 31, 1905.

Application filed May 4, 1905. Serial No. 258,883.

*To all whom it may concern:*

Be it known that I, MARK S. LEWIS, a citizen of the United States, residing at Medford, in the county of Middlesex and State of Massachusetts, have invented a new and useful Improvement in Long-Distance Electric Circuits, of which the following, taken in connection with the accompanying drawing, is a specification.

My invention relates to a method of conveying electrical impulses for long distances, particularly adapted for telegraphic and telephonic messages; and it consists in the use of two wires and intermediary condensers, the object being to utilize induction and to overcome to some extent resistance and impedance. These objects I attain by the mechanism shown in the accompanying drawing, in which the entire apparatus is shown diagrammatically.

As my invention relates to the transmission of electrical impulses, and thereby sound waves or signals, it is not necessary to describe the particular instruments and appliances operated by said impulses. In the diagram the conductors or wires forming one side of the circuit are indicated by A and B, the stations by S and S', and the condensers by C and C'. The wires A and B may be both inclosed in a single cable, or they may be in separate cables. In the diagram two condensers C and C' are shown as located near the ends; but I do not confine myself to any number of condensers nor to any particular location. The number and location of these devices is to be determined by the use and conditions of the apparatus.

I show in the drawing a conductor consisting of two wires A and B. One wire—A, for instance—is connected at one end to a telephone, telegraph, or other signaling instrument leading to a battery and ground, the opposite end of the wire A being left disconnected and open except so far as the condensers act. At one end of the wire B (see drawing) is shown a like telephone, telegraph, or other signaling instrument connected and leading thence to a battery and ground, the opposite end of the wire B being left disconnected and open except so far as the condensers act. I also show one or more condensers C and C' of suitable capacity placed between the two conductors at each end of the pair of conductors and connected across from conductor A to conductor B, which completes the arrangement of this part of the circuit.

From the above description it may be seen that my system is not metallic, but consists of two wires arranged into one conductor of great capacity and low resistance, terminating at the ground at each end.

My claim as an advantage of my system is that by connecting two wires forming a conductor of a circuit in the manner described I utilize and make use of the modifying effect of the wire A on the electrostatic capacity of the wire B, thus increasing the capacity of the conductor.

It is obvious that signals sent out from the station (marked S) cannot pass the station S' upon wire A, as its distant end is open and disconnected except by the condensers. Therefore the impulses sent from A are led by the condensers across the circuit to wire B, where they cannot return back, as is usual, to S on wire A, as that is also open at S. Therefore these impulses are attracted to S' by the ground at S' and follow the strong paths of induced currents set up by the condensers between A and B of the circuit, as shown by dotted lines in the drawing.

The peculiarity of my apparatus consists in a circuit composed of two wires in one submarine cable or one wire in each of two submarine cables laid parallel to each other, or two wires strung upon pole-lines upon land, these two wires so arranged as to make one conductor of great capacity and conductivity by intermediate condensers in multiple, as described.

I claim—

In an electric circuit, a conductor comprising two wires connected only by condensers in multiple, each wire having one end open, the other end being connected to a telephone, telegraph, or other signaling instrument leading to a battery and ground; substantially as and for the purpose set forth.

In testimony whereof I have signed my name to this specification, in the presence of two subscribing witnesses, on this 29th day of April, A. D. 1905.

MARK S. LEWIS.

Witnesses:
     FRANK G. PARKER,
     JOHN BUCKLER.